United States Patent [19]

Gupta et al.

[11] Patent Number: 4,578,684

[45] Date of Patent: Mar. 25, 1986

[54] OPTICAL RECORDING AND INFORMATION ELEMENTS

[75] Inventors: Mool C. Gupta, W. Webster; Douglas G. Stinson, Fairport, both of N.Y.

[73] Assignee: Eastman Kodak Company, Rochester, N.Y.

[21] Appl. No.: 706,985

[22] Filed: Feb. 28, 1985

[51] Int. Cl.[4] .................... G01D 15/34; B32B 27/00; G03C 1/00

[52] U.S. Cl. .............................. 346/135.1; 369/100; 427/162; 428/425.6; 428/425.9; 428/425.8; 428/913; 430/495; 430/945

[58] Field of Search .................... 346/135.1; 369/100; 427/162; 428/425.6–425.9, 913; 430/495, 945

[56] References Cited

U.S. PATENT DOCUMENTS

| | | | |
|---|---|---|---|
| 4,195,313 | 3/1980 | Bell et al. | 369/275 |
| 4,214,249 | 7/1980 | Kasai et al. | 346/76 L X |
| 4,233,626 | 11/1980 | Bell | 358/128.5 |
| 4,270,132 | 5/1981 | Bell | 346/135.1 |
| 4,329,697 | 5/1982 | Bell | 346/135.1 |
| 4,340,959 | 7/1982 | Levin | 369/275 |
| 4,373,004 | 2/1983 | Asano et al. | 428/328 X |
| 4,380,769 | 4/1983 | Thomas et al. | 346/135.1 |
| 4,415,650 | 11/1983 | Kido et al. | 430/273 X |
| 4,465,767 | 8/1984 | Oba et al. | 430/271 X |

FOREIGN PATENT DOCUMENTS

| | | | |
|---|---|---|---|
| 58-137149 | 8/1983 | Japan | 369/100 |

*Primary Examiner*—E. A. Goldberg
*Assistant Examiner*—Gerald E. Preston
*Attorney, Agent, or Firm*—J. Richard Everett

[57] ABSTRACT

Optical recording elements having metal reflective layers which are coated on both sides with a ceramic overcoat are disclosed.

8 Claims, 3 Drawing Figures

6
5
4
3
2
1

OPTICAL RECORDING AND INFORMATION ELEMENTS

FIELD OF THE INVENTION

This invention relates to optical recording elements having metal reflective layers.

BACKGROUND OF THE INVENTION

Optical recording elements in which information is recorded by thermally deforming an optical recording layer are known. Such elements are useful in rapidly recording large amounts of digital information in a small area. These elements are also useful in recording video information.

Recording on an optical recording element is accomplished by an information modulated beam of high energy density radiation such as a laser beam. The laser beam is focused on the surface of the optical recording layer of the element. The recording layer absorbs energy from the laser so that a small portion of the layer is deformed, thereby forming an information bearing record element. The deformations may be in the form of pits, holes or other changes in the material. For example, if "bubbles" are formed, the material is "deformed" but not "ablated".

Generally, there is continuous relative motion between the laser beam and the layer and the recording layer so that as the recording laser is pulse modulated, discrete deformations varied in sizes are created in the layer. The size and spaces of these deformations constitute the encoded information.

The recorded information is also read back by a laser beam. In the read back cycle, the optical contrast from a recorded and unrecorded region is read by a laser beam via transmission or reflection. Most practical systems are based on reflection. If the recording layer is itself partially reflecting, then the optical contrast is obtained from light reflecting from the recording layer of the recorded and unrecorded regions.

In optical recording elements which are not highly reflective such as some heat-deformable recording layers, a metal reflective layer is used under the recording layer.

Pin holes tend to form in the metal reflective layer. This is particularly true in situations in which the metal film is in contact with organic layers such as organic supports, organic smoothing layers on the support or an organic recording layer. Pin holes in the metal reflective layer cause problems in the laser recording because light is not reflected in the area of the pin holes. This causes localized changes in recording sensitivity. The pin holes also give rise to higher noise and produces defects in recorded pictures. They also give rise to an increase in bit error rate during digital recording and read back.

Metal reflective layers having transparent ceramic overcoats are known, for example, from U.S. Pat. No. 4,195,312. The optical recording element disclosed therein comprises a substrate bearing a light reflective material such as aluminum and a layer of a transparent ceramic material such as silicon dioxide and an organic dye recording layer. The problem is that significant pin holes still form in the metal reflective layer resulting in the problems of low signal-to-noise ratio, high bit error rates and picture defects.

SUMMARY OF THE INVENTION

The present invention provides an optical recording element comprising a support bearing a metal reflective layer having thereover a heat-deformable recording layer characterized in that (a) a transparent ceramic layer is present between the support and the reflective layer and (b) a transparent ceramic layer having a thickness up to 0.05 μm is present between the reflector layer and the recording layer.

The foregoing element in which transparent ceramic overcoats are on both sides of the reflecting layer dramatically minimizes the pin hole problem of prior art optical recording and optical information bearing elements having a reflective layer.

In a preferred embodiment, the transparent ceramic layer between the recording layer and the reflective layer has a thickness of 0.02 to 0.05 μm.

DETAILS OF THE INVENTION

Figure 1:
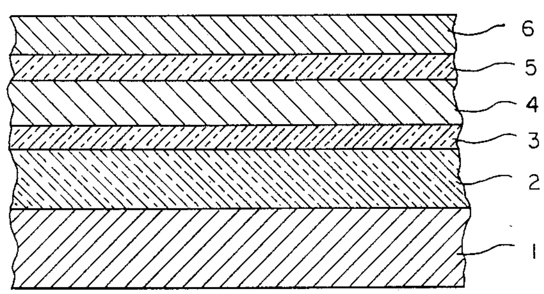
FIG. 1 shows one embodiment of the present invention.

A heat-deformable optical recording layer is any layer which is capable of undergoing thermal deformation when exposed to a beam of high energy-density radiation such as a laser beam. Deformations have been referred to in the art as pits, craters, depressions and cavities. Useful layers include thin vacuum-evaporated layers of metal such as bismuth, rhodium, titanium, tellurium and platinum. Layers of vacuum-evaporated dyes are also useful, such as those described in Spong U.S. Pat. No. 4,190,843, issued Feb. 26, 1980. Bilayer and trilayer optical interference films are also useful. Useful recording layers also include chalcogenides such as those described in Kasai et al. U.S. Pat. No. 4,069,487 and solvent-coated dyebinder layers.

Particularly useful optical recording elements having heat-deformable recording layers are disclosed in Thomas et al. U.S. Pat. No. 4,380,769 granted Apr. 19, 1983. Such recording elements comprise a support having thereon a heat-deformable optical recording layer that (a) is an amorphous layer of a dye and a binder;

(b) has an absorption factor of at least 20 at a first wavelength and is substantially transparent at a second wavelength; and (c) is capable of being thermally deformed by a beam of high energy density radiation of the first wavelength to form a deformation comprising a hole or depression.

Such elements may also have a transparent ceramic overcoat over the recording layer. The "absorption factor" of the amorphous material is defined as the product of the weight fraction of dye included in the amorphous material and the molar extinction coefficient of the dye at the wavelength of the recording beam of choice, divided by the molecular weight of the dye (MW), and having the units of liter per gm-cm.

Other useful optical recording elements are disclosed in U.S. Pat. No. 4,415,621 granted to Specht et al, Nov. 15, 1983; U.S. patent application No. 391,769 filed June 24, 1982 in the name of Wadsworth et al, now U.S. Pat. No. 4,446,223 and U.S. patent application No. 473,825, filed Mar. 9, 1983 in the name of Molaire.

Useful ceramic layers can be formed from aluminum oxide, silicon monoxide (SiO), silicon dioxide ($SiO_2$), silica, glass such as Schott-Glass® (available from Schott Glass Company), quartz and magnesium fluoride ($MgF_2$).

The metal reflective layer may be selected from any highly reflective metal such as gold, aluminum, nickel, chromium and aluminium. Aluminum is preferred.

In preparing optical recording elements containing the transparent ceramic layers described herein, the ceramic material may be coated on the substrate. The reflective layer is then coated over the transparent ceramic layer. Then a transparent ceramic layer having a thickness up to 0.05 μm is coated over the metal reflective layer followed by a coating of the heat-deformable recording layer.

The support can be made from a number of materials such as glass plate, a resin film or plate such as polyethylene terephthlate or cellulose acetate, paper, clay, wood or metal, to name a few among many. Important characteristics of the support are that it have a relatively high melting point (to avoid deformation during recording), having a very smooth surface (to minimize noise), and be capable of being coated with a layer of amorphous material with good adhesion and no significant chemical reaction between the layer and the support.

In certain embodiments the support is coated with a smoothing layer prior to the coating of the transparent ceramic layer. The composition which is used to form the smoothing layer is preferrably a low viscosity polymerizable fluid which is coated on the surface of the support. Useful low viscosity, polymerizable fluids are disclosed in U.S. Pat. No. 4,380,769. Following coating, polymerization of the fluid produces a microsmooth surface on the support. The transparent ceramic layer is then coated on the smoothing layer by vacuum deposition or by spin coating followed by heat treatment.

The thickness of the transparent ceramic layer over the support, or optionally over the smoothing layer, is not critical since such layers do not participate in the laser write or read process. However, thicknesses in the range of 0.05 μm to 0.5 μm are considered practical.

The reflective layer is then coated on the transparent ceramic layer by vacuum deposition.

Another transparent ceramic layer is then coated over the metal reflecting layer. The thickness of this transparent ceramic layer is important because of constraints on both the thickness of the ceramic layer and of the recording layer for maximum light absorption and read out contrast. The thickness of the transparent ceramic layer is chosen such that it protects the aluminum film from pin hole formation but does not interfere with laser recording and read back. The thickness of this transparent ceramic layer will depend upon the recording medium. For heat-deformable layers comprising a dye and a binder, the thickness of the ceramic layer should preferably be in the range of 0.02 μm to 0.05 μm to sustain the high performance of laser recording. We have found that thicknesses within this range provide sufficient protection to the reflective layer and still not interfere unacceptably with the laser recording and readback sensitivities. Of course, thicknesses below this range provide some protection against pin hole and are better than no ceramic layer at all. Thicknesses above this range have a deleterious effect on laser write and read sensitivity.

The recording layer is then coated on the transparent ceramic layer by spin coating or vacuum deposition.

In FIG. 1 an optical recording element, according to the present invention, is depicted schematically. Ihe element comprises in the following order a support 1, a smoothing layer 2, a transparent ceramic layer 3, a metal reflecting layer 4, another transparent ceramic layer 5 having a thickness of up to 0.05 μm, and a heat-deformable recording layer 6.

Figure 2:
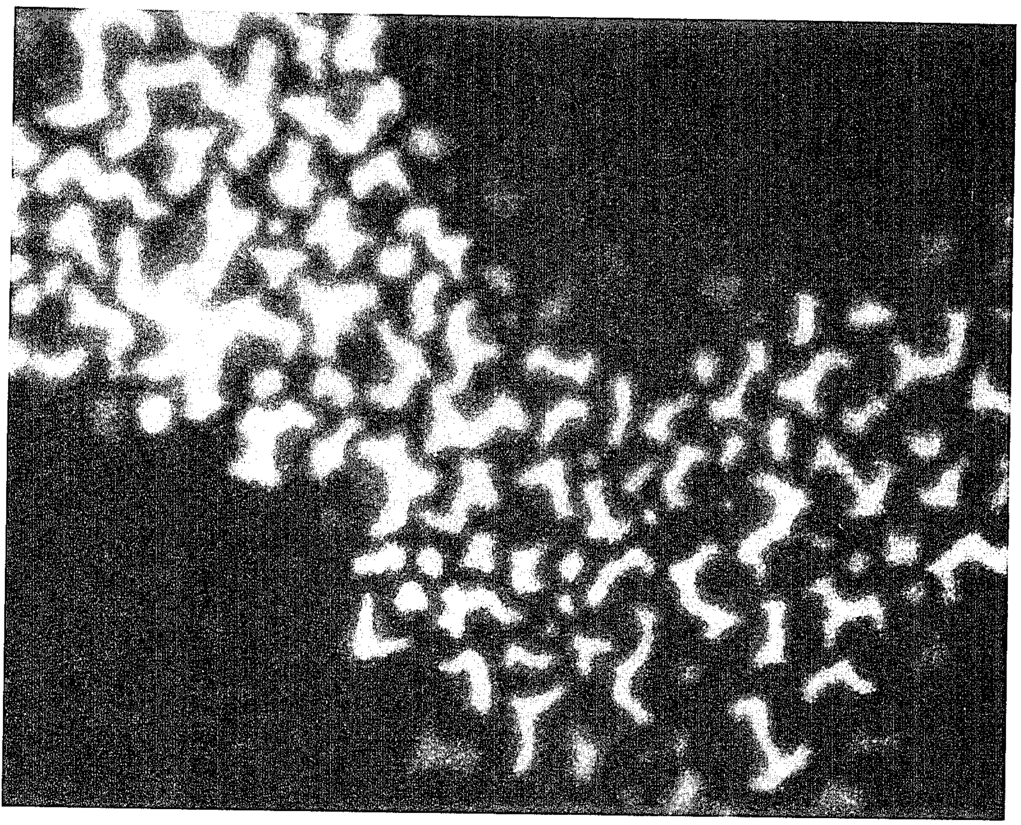
FIG. 2 shows the density of pin hole defects in the metal reflective layer in an element in which a single transparent ceramic layer is present between the reflecting layer and the recording layer.
Figure 3:
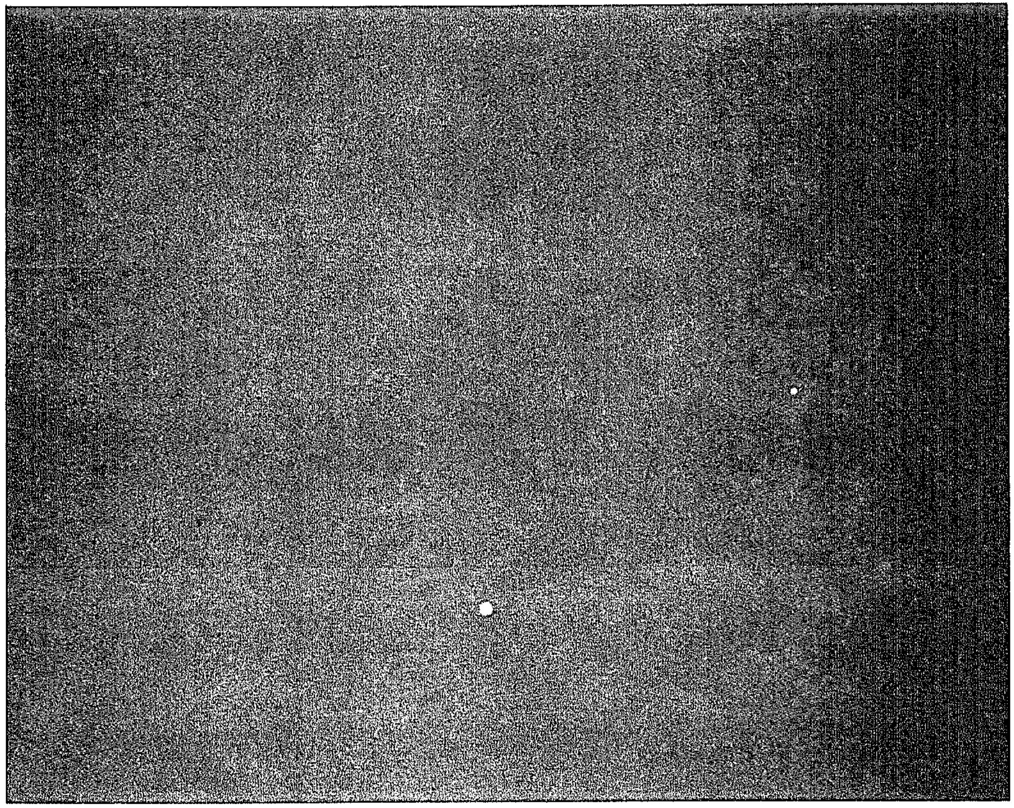
FIG. 3 shows the density of pin hole defects in the metal reflecting layer when a transparent ceramic coating is present on both sides of the reflective layer.

Our work shows that when a 0.05 μm layer of transparent ceramic $MgF_2$ is deposited under and over a 0.05 μm aluminum reflective layer, no pin holes form after sixty days of setting with the sample at 12 pounds per square inch of tension, 140° C. and 50° relative humidity. Similar results are obtained with other refractive materials such as $SiO_2$ and Shott Glass. For a given thickness, glass provides slightly better protection, and a higher quality, amorphous film. When the metal film is protected either from the top only or from the bottom only, pin holes still develop such as shown in FIG. 2. When both sides are protected the decline in the number of pin holes is dramatic.

The invention has been described in detail with particular reference to preferred embodiments thereof, but it will be understood that variations and modifications can be effected within the spirit and scope of the invention.

We claim:

1. An optical recording element comprising a support bearing a metal reflective layer having thereover a heat-deformable recording layer characterized in that (a) a transparent ceramic layer is present between the support and the reflective layer and (b) a transparent ceramic layer having a thickness up to 0.05 μm is present between the reflective layer and the recording layer.

2. The element of claim 1 wherein the thickness of the transparent ceramic layer between the reflective layer and the recording layer has a thickness of 0.02 μm to 0.05 μm.

3. The element of claim 1 or 2 wherein the reflective layers are aluminum.

4. The element of claim 1 or 2 wherein the transparent ceramic layers are $SiO_2$.

5. The element of claim 1 or 2 wherein the heat-deformable layer (a) is an amorphous layer of a dye and a binder;

(b) has an absorption factor of at least about 20 at a first wavelength and is substantially transparent at a second wavelength.

6. The element of claim 1 or 2 wherein the transparent ceramic layers are Schott Glass.

7. The element of claim 1 or 2 wherein a smoothing layer is present between the support and the transparent ceramic layer.

8. The element of claim 1 or 2 wherein the transparent ceramic layers are SiO.

* * * * *